United States Patent Office 2,886,540
Patented May 12, 1959

2,886,540

PHENOL-FORMALDEHYDE-KETONE CONDENSATE AND STARCH COMPOSITION

Thomas J. McNaughtan, Elkins Park, Pa., and David J. Lieb and Ulrich Boschert, Bainbridge, N.Y.

No Drawing. Application June 3, 1955
Serial No. 513,165

1 Claim. (Cl. 260—17.2)

This invention relates to treated starch and, more particularly, to a composition including starch partly in gelatinized and partly in suspended non-galatinized condition and an alkali-catalyzed condensation product of a ketone, formaldehyde and phenol.

Starch adhesives have long been used in the manufacture of corrugated paper board and the like. There have been disadvantages in such uses, including the time required for setting up of the adhesive and lack of resistance of the set adhesive to water. Numerous attempts have been made to overcome these disadvantages, including the use of resins in conjunction with the starch in dextrinized condition.

Our invention provides a composition that makes predextrinization unnecessary, retains the starch in suspended or dispersed condition in the adhesive composition, gives to the set adhesive the desired water resistance that is lacking when gelatinized starch is used alone, and gives also the quick setting characteristic desirable for modern high speed manufacturing procedures. This high speed of setting is in contrast with the slower speed when an acid cured urea formaldehyde resin is used.

Briefly stated, our invention comprises the herein described product resulting from condensing a water soluble ketone, formaldehyde and phenol under alkaline conditions and mixing the aqueous solution of the condensation product with starch partly in gelatinized and partly in suspended non-gelatinized condition, the condensation product at the time of mixing being in the resole (water soluble) stage and being associated with an alkali metal alkali in amount to form a salt with the acidic hydroxy group of the condensation product to the extent at least that the pH is substantially above 7.

Alkali so associated with the 3-component condensation product does not exhibit such caustic alkalinity as to interfere with use of the adhesive for a wide variety of uses. The alkali salt product, on the other hand, does contribute to forming a good suspension of the starch. The usable life of the adhesive (time after final dilution before actual use) is extended to a day or more as compared to a much shorter usable life for starch compositions with previously used acetone formaldehyde condensation products.

As to materials, the ketone may be any water soluble ketone susceptible to condensation with formaldehyde. Examples of such ketones that may be used are acetone, diacetone alcohol, and acetonyl acetone.

As the aldehyde we know no one that is better for our purpose than formaldehyde. This, therefore, is the aldehyde that we ordinarily use. The formaldehyde may be used as such, as in commercial formalin solution, or as paraformaldehyde or other source of formaldehyde.

The phenol may be used in the form of either pure or commercial grade or technical 90% phenol which contains a substantial proportion of cresol. Cresol alone is uneconomical as a substitute for phenol.

The formaldehyde is reacted in the proportion of at least 1.5 moles for 1 molecular proportion of the acetone and phenol jointly. We may use higher proportions of formaldehyde, as in amounts up to 3 moles for the 1 mole of the other two reactants together. In general, the higher proportions within this range are used when it is desired to increase the water solubility or decrease the viscosity of the product in aqueous solution.

The ketone is used in the proportion of 0.5–5 moles for 1 of the phenol.

Water is introduced, as in the proportion associated with formaldehyde in commercial formalin solutions.

The proportion of the condensation product used is minor as compared to the starch in the final adhesive composition. Thus we may use 1–15% of the 3-component condensation product on the dry basis for 100 of total starch in the finished adhesive.

To establish the pH on the alkaline side of 7 during the condensation and provide alkali metal for the condensation product salt that is to be mixed finally with the starch, we add such alkalies as potassium and sodium carbonates and hydroxides.

As to conditions, the condensation at all stages is effected at a pH above 7 and in commercial operation at a pH within the range 8–11.

The material being condensed may be concentrated during progress of the condensation, as by being heated and evacuated at various stages to remove some of the water and some of the acetone or formaldehyde when no further use of them is to be effected.

We conduct the condensation to the stage at which reaction involving consumption of formaldehyde becomes slow, i.e. until the proportion of free formaldehyde ceases to fall rapidly. It is necessary to stop the condensation before the finished three-component condensation product becomes insoluble in water, i.e., when the product is in the resole or A-stage.

The invention will be further illustrated by description in connection with the following specific examples of the practice of it. In these examples and elsewhere herein proportions are expressed as parts by weight unless specifically stated to the contrary. Molecular proportions are stated approximately.

*Example 1*

566 parts of acetone (9.8 moles) were mixed with 16 parts of potassium carbonate previously dissolved in 8 parts of water. The resulting solution was heated to refluxing. Then 1694 parts (21 moles) of a commercial formalin solution of concentration 37.5% was introduced slowly over a period of 2 hours. The pH of the resulting mixture was 10. The mixture was refluxed for an hour and then cooled by evacuation to 70° C. The pH at this point was 9.3.

Then there were added 566 parts (6 moles) of 90% technical phenol. The material was held at 85°–90° C. and 680 parts (8.5 moles) of the 37.5% formalin solution were added at a temperature of about 80°–85° C., the pH now being 8.7. All the formaldehyde may be added before the phenol is introduced.

The whole composition was held at 80°–85° C. for 2 hours. At this time, the content of free formaldehyde became practically constant except for small mechanical losses.

The whole was then subjected to vacuum distillation to remove volatiles and most of the water, up to a temperature of 80° C.

The remaining product was a viscous solution of solids content 87.5% weighing 1570 parts and having a pH of 8.05.

When mixed with 1% of its weight of sodium hydroxide, the resulting material cured at 154° C. in 3 seconds.

To make a starch adhesive, a suspension was made as follows: the said viscous solution made as described above and including the sodium salt of the 3-component condensation product was mixed in the proportion of 41 parts of the solution of 87.5% solids with 1330 of water, 700 of pearl corn starch, and 15 of urea, the latter serving as an acceptor for formaldehyde so as to decrease the odor of formaldehyde during use of the product.

Another mixture was made including 450 parts of water and 125 parts of 50-fluidity corn starch. These two materials were slurried together at 90° F. and stirred with a solution of 13.3 parts of sodium hydroxide in 35 of water. The alkali caused gelatinization of the starch.

The gelatinized starch solution thus made was then mixed with the previously formed starch suspension. The gelatinized starch provides a thickening effect in the finished product.

The resulting mixture was ready for use as an adhesive, after dilution to concentration desired or compounding with conventional additives.

The adhesive so made meets the requirement for quick set and waterproofness. Thus a representative lot of the condensation product in this adhesive set more rapidly than a formaldehyde phenol binder ordinarily used with starch and faster also than an acetone formaldehyde condensation product.

*Example 2*

1700 parts (29.2 moles) of acetone were heated to reflux and mixed with 24 parts of potassium carbonate in 108 parts of water. To the refluxing solution, at refluxing temperature and over a 3 hour period, there were added 3500 parts (51.3 moles) of 44% formalin solution. The mixture was then refluxed for 1 hour, the final temperature being 72° C.

Over a period of a half hour there were added 1530 parts (16.3 moles) of technical 90% phenol. Then there were introduced 1570 parts (23 moles) of the 44% formalin solution, the addition extending over one hour's time. The whole was then refluxed 2 hours.

Then the resulting solution was concentrated at temperatures up to 50° C. in a 26" vacuum to a final viscosity of 2000 c.p.s. The yield was 5200 parts of the concentrated solution.

In making a starch composition for use as adhesive the following compositions were made:

*Mixture A.*—100 parts of an aqueous solution of the condensation product of Example 2, 1450 of water, 470 of the pearl corn starch, and 15 of borax were mixed cold.

*Mixture B.*—150 parts of pearl starch, 500 of water, and 15 of sodium hydroxide in 50 of water were mixed, heated to 85°–95° C. for 5 min., and then cooled to 50° C.

Mixtures A and B were then mixed together, to give a mix in which the starch is dispersed, partly in suspended and partly in gelatinized form. The proportion of the condensation product on the dry basis was 7% of the weight of the total starch used. The result was an adhesive of long pot life, quick setting time, and satisfactory water resistance adapted for use, for instance, in making corrugated paper products and the like.

In use, the adhesive composition was spread as film upon paper and plied with a similar sheet pressed upon the adhesive film. The laminate was heated to approximately 65° C. to gelatinize the suspended starch in contact with the alkali-catalyzed resin and to remove moisture.

*Example 3*

The procedure of Example 1 is followed except that diacetone alcohol is substituted on an equimolecular weight basis for the acetone. The product is a water soluble resin. As compared to the product made with acetone, the diacetone alcohol product has superior properties for certain purposes.

*Example 4*

The procedure of Example 1 is followed except that acetonyl acetone is substituted on an equimolecular weight basis for the acetone, in making a water soluble resinous condensation product.

It will be understood that it is intended to cover all changes and modifications of the examples of the invention herein chosen for the purpose of illustration which do not constitute departures from the spirit and scope of the invention.

What we claim is:

An adhesive consisting essentially of (1) gelatinized starch in (2) an aqueous solution of a water soluble alkali metal salt of an alkali-catalyzed thermosetting condensation product of formaldehyde, phenol and a ketone selected from the group consisting of acetone, diacetone alcohol, and acetonyl acetone, proportions represented in the condensation product being 1.5–3 moles of formaldehyde for 1 mole of the ketone and phenol together and 0.5–5 moles of the ketone for 1 mole of phenol, and (3) starch in ungelatinized condition dispersed in the said solution, the said salt being the product of reaction of the said condensation product with an alkaline alkali metal compound in amount to neutralize the hydroxyl group acidity of the condensation product with attendant formation of the said salt and to establish the pH above 7 and the proportion of the said condensation product being 1–15 parts on the dry basis for 100 of total weight of starch.

References Cited in the file of this patent

UNITED STATES PATENTS

| 1,107,003 | Wennagel | Aug. 11, 1914 |
| 2,529,851 | Scrutchfield | Nov. 14, 1951 |
| 2,650,205 | Kesler et al. | Aug. 25, 1953 |

FOREIGN PATENTS

| 299,781 | Great Britain | Dec. 12, 1929 |